United States Patent
Okazaki et al.

(10) Patent No.: US 6,228,981 B1
(45) Date of Patent: May 8, 2001

(54) PROCESS FOR PREPARING AN AQUEOUS DISPERSION COATING MATERIAL AND PROCESS FOR PREPARING A POWDER COATING MATERIAL

(75) Inventors: Haruhiko Okazaki, Nisikasugai-gun; Akiko Tagami, Nagoya, both of (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 0 days.

(21) Appl. No.: 09/323,537

(22) Filed: Jun. 1, 1999

(30) Foreign Application Priority Data

Jun. 2, 1998 (JP) .................................................. 10-152765

(51) Int. Cl.$^7$ ........................................................ C08J 3/12
(52) U.S. Cl. ..................... 528/499; 528/502 R; 528/503; 528/902
(58) Field of Search ............................... 528/499, 502 R, 528/503, 902; 524/544

(56) References Cited

U.S. PATENT DOCUMENTS 3,998,768 * 12/1976 Pettit, Jr. ........................... 528/902 X
5,610,269 * 3/1997 Sato et al. .............................. 528/499
6,013,700 * 1/2000 Asano et al. ...................... 528/499 X

FOREIGN PATENT DOCUMENTS 0 755 986   1/1997  (EP) .
0 844 286   5/1998  (EP) .
2 547 592   12/1984 (FR) .

* cited by examiner

*Primary Examiner*—Fred Teskin
(74) *Attorney, Agent, or Firm*—Oblon, Spivak, McClelland, Maier & Neustadt, P.C.

(57) ABSTRACT

A process for preparing an aqueous dispersion coating material containing a resin component having a softening temperature of from 10 to 250° C., which comprises:

(1) a step of mixing various starting materials which will be coating film-constituting components, to obtain a blend material, (2) a step of melting and kneading the blend material at a temperature of at least the softening temperature of said resin component, to obtain a homogenized material, (3) a step of cooling and solidifying the homogenized material, followed by crushing, to obtain coarse particles, and (4) a step of wet-pulverizing the coarse particles in an aqueous dispersant, to obtain an aqueous dispersion coating material containing fine particles having an average particle size of at most 10 µm.

4 Claims, No Drawings

PROCESS FOR PREPARING AN AQUEOUS DISPERSION COATING MATERIAL AND PROCESS FOR PREPARING A POWDER COATING MATERIAL

The present invention relates to a process for preparing an aqueous dispersion coating material and a process for preparing a powder coating material. More particularly, the present invention relates to a process for producing an aqueous dispersion coating material and a process for producing a powder coating material, wherein various materials which will be coating film-constituting components, are blended, melted and kneaded, then cooled and solidified, and crushed to obtain coarse particles, and then, the coarse particles are wet-pulverized in an aqueous dispersant to form fine particles and be dispersed.

Heretofore, as an aqueous dispersion coating material, a slurry coating material prepared by a phase transition method for an aqueous dispersion coating material obtained by wetting in an aqueous medium fine particles obtained by finely pulverizing a powder coating material, has been known.

As disclosed in JP-A-8-311369, preparation of a slurry coating material by a phase transition method, is a technique wherein from a solvent type coating material employing a water-soluble organic solvent, the organic solvent is removed to form coating resin particles, and then the coating resin particles are dispersed in water to prepare a slurry coating material. By this technique, it is necessary to prepare a solvent type coating material, forcibly emulsify the solvent type coating material in water in order to remove the organic solvent, remove the organic solvent to prepare solid coating resin particles and disperse the coating resin particles in water. Namely, many steps are required, and further, it has been necessary to recover the organic solvent from water.

Further, in the method for removing the organic solvent directly from the solvent type coating material by heating and reduced pressure, the concentration of non-volatile contents and the concentration of the resin component tend to be high towards the end point of the removal, and the viscosity tends to be high due to the resin component having a high concentration. Accordingly, a large quantity of energy has been required to completely remove the organic solvent. As an additional problem, the coating resin obtained by removing the organic solvent tends to be bulky, and in order to disperse it stably in water, it has been necessary to finely pulverize the resin.

A problem resulting from this fine pulverization is such that as the particle size of the fine resin powder becomes small, the efficiency of energy required for fine pulverization tends to be poor, and a special technique will be required for capturing the fine powder, in the same manner as for the preparation of a fine powder to be used as a powder coating material.

It is an object of the present invention to provide a process for producing an aqueous dispersion coating material, which is free from the above mentioned various problems. Namely, it is an object of the present invention to provide a process for producing a powder coating material at a low cost with a relatively simple operation without necessity to use an organic solvent or without necessity of a trouble of capturing a fine powder.

The present inventors have conducted an extensive research to accomplish the above object and as a result, have found that an aqueous dispersion coating material having good stability, wherein the average particle size of fine particles of coating resin is at most 10 μm, can be obtained in good yield with good energy efficiency, by blending various starting materials which will be coating film-constituting components, melt-kneading the blend material, cooling and solidifying it, followed by crushing to obtain coarse particles, then wet-pulverizing the coarse particles in an aqueous dispersant, for example, by introducing coarse particles to a wet system pulverizer wherein an aqueous medium for dispersion is circulated, to pulverize the desired coating resin particles to fine particles and directly dispersing them in water, i.e. by carrying out pulverization into fine particles, stabilization of the dispersion and capturing fine particles at the same time, and that a powder coating material can be obtained very well by subjecting the aqueous dispersion coating material to dehydration treatment. The present invention has been accomplished on the basis of these discoveries.

Namely, the present invention provides a process for preparing an aqueous dispersion coating material containing a resin component having a softening temperature of from 10 to 250° C., which comprises:

(1) a step of mixing various starting materials which will be coating film-constituting components, to obtain a blend material, (2) a step of melting and kneading the blend material at a temperature of at least the softening temperature of said resin component, to obtain a homogenized material, (3) a step of cooling and solidifying the homogenized material, followed by crushing, to obtain coarse particles, and (4) a step of wet-pulverizing the coarse particles in an aqueous dispersant, to obtain an aqueous dispersion coating material containing fine particles having an average particle size of at most 10 μm.

Further, the present invention provides a process for preparing a powder coating material containing a resin component having a softening temperature of from 10 to 250° C., which comprises:

(1) a step of mixing various starting materials which will be coating film-constituting components, to obtain a blend material, (2) a step of melting and kneading the blend material at a temperature of at least the softening temperature of said resin component, to obtain a homogenized material, (3) a step of cooling and solidifying the homogenized material, followed by crushing, to obtain coarse particles, (4) a step of wet-pulverizing the coarse particles in an aqueous dispersant, to obtain an aqueous dispersion containing fine particles having an average particle size of at most 10 μm and (5) a step of subjecting the aqueous dispersion to dehydration treatment, to obtain a powder coating material.

Now, the present invention will be described in detail with reference to the preferred embodiments.

In order for the aqueous dispersion coating material or the powder coating material obtained by the process of the present invention to form a coating film, it is necessary that after it is coated, the resin component will be softened or melted by heating to form a uniform coating film.

For this purpose, the softening temperature of the resin component which will be a coating film-constituting component, is required to be from 10 to 250° C. More preferably, the softening temperature is from 30 to 200° C.

If the softening temperature of the resin component is lower than 10° C., the coating resin particles in the aqueous dispersion coating material are likely to agglomerate even during the storage at room temperature, because as compared with an emulsion coating material, the particle sizes of the coating resin particles are larger by 100 times to 1,000 times. By reducing the average particle size of the coating resin particles in the aqueous dispersion coating material, it is possible to maintain the aqueous dispersion coating material stably even with coating resin particles of a resin component having a low softening temperature. However, in such a case, the total surface area of coating resin particles in the aqueous dispersion coating material increases, whereby a wetting agent such as a surfactant is required to be present in a large amount in order to disperse the coating resin particles stably in the aqueous medium. Accordingly, in such a case, the resulting coating film tends to be poor in such a performance as water resistance or gloss.

Further, if the softening temperature of the resin component exceeds 250° C., a temperature exceeding 250° C. will be required for heat curing to form a coating film, and at such a high temperature, the coating film is likely to undergo yellowing, or the coating film is likely to be oxidized by air and tends to loose flexibility. As a method for preventing such a phenomenon, a method may be mentioned as a special case wherein film-forming is carried out in an inert gas atmosphere such as carbon dioxide gas. However, in such a case, an extra apparatus to form such an inert gas atmosphere will be required. Otherwise, such a phenomenon tends to hardly occur when a coating material employing an olefin resin or a high molecular weight fluorine resin as the resin component, is used to form a film.

The resin component having a softening temperature of from 10 to 250° C., may, for example, be an alkyd resin, an acrylic resin, a polyester resin, an epoxy resin, a melamine resin, a block isocyanate resin, a fluorine resin, a silicone resin, an amide resin or an ABS resin. These resin components may be used alone or, if required, may be used in combination in an optional blend ratio. Further, if necessary, additives, such as, a dibasic acid or a polybasic acid, a curing agent such as a polyamide resin, a surface-regulating agent and a curing accelerator, which are commonly used for coating materials, may be added.

In addition to such resin and curing agent, it is effective to incorporate a coloring pigment, a rust-preventing pigment or an additive to impart other functions, as a coating film-constituting component. As such a coloring pigment, an inorganic pigment such as yellow iron oxide, titanium yellow, iron oxide red, titanium oxide, zinc white, lithopone, white lead, zinc sulfide or antimony oxide, or an organic pigment such as hansa yellow 5G, permanent yellow FGL, phthalocyanine blue, indanthrene blue RS, permanent red F5RK, brilliant first scarlet G, paliogen red 3910, may be mentioned.

The amount of such a pigment in the coating resin particles is usually at a level of from 0.5 to 60% by PWC. However, as in the case of a clear coating material, no such pigment may be incorporated. In a case where the amount of such a pigment is large, particularly in the case of a pigment having a high oil absorption, if a coating film is formed by using such a coating material, smoothness of the coating film tends to be impaired. Further, for the purpose of adjusting the gloss or the hardness of the coating film, an extender may be incorporated such as barium sulfate, barium carbonate, calcium carbonate, clay, silica powder, fine powdery silicic acid, diatomasus earth, talc, basic magnesium carbonate or alumna white.

METALLIC

The aqueous dispersion coating material or the powder coating material obtained by the process of the present invention may be made into a metallic coating material by incorporating a bright scaly pigment to the coating r esin particles. As such a b right scaly pigment, a usual aluminum pigment, a mica pigment, a bronze powder, a copper powder, a stainless steel powder, a metal-coated glass powder, a metal-coated mica powder or a metal-coated plastic powder, may, for example, be used. In the case of the aqueous dispersion coating material, such a bright scaly pigment may be incorporated in the coating resin particles. However, preferably, it is incorporated in the aqueous medium of the aqueous dispersion coating material separately from the coating resin particles. The method for the incorporation is not particularly limited, but it is common that the bright scaly pigment surface is preliminarily made hydrophilic with a water-soluble solvent or with a surfactant, and further, if necessary, it may be added in combination with a water-soluble resin or an additive.

These bright scaly pigments may be incorporated alone or in combination as a mixture of two or more of them. The amount of such a bright scaly pigment in the coating material is preferably at a level of from 0.05 to 30 wt % of the total solid content.

LUSTER ADJUSTMENT

To adjust the luster of the coating film obtained by using the aqueous dispersion coating material or the powder coating material obtained by the process of the present invention, a flatting extender may be incorporated to the aqueous dispersion coating material or the powder coating material. Otherwise, at least two types of coating resin particles may be used for the aqueous dispersion coating material or the powder coating material, so that the luster is adjusted by the difference in the compatibility or in the reaction rate among such coating resin particles. As the luster-adjusting agent for the aqueous dispersion coating material or the powder coating material, colloidal silica, alumna or talc, which is commonly used for coating materials, may be employed.

PROCESS FOR PREPARING THE AQUEOUS DISPERSION COATING MATERIAL

The process for preparing an aqueous dispersion coating material according to the present invention, comprises sequentially carrying out:

(1) a step of mixing various starting materials which will be coating film-constituting components, to obtain a blend material, (2) a step of melting and kneading the blend material at a temperature of at least the softening temperature of said resin component, to obtain a homogenized material, (3) a step of cooling and solidifying the homogenized material, followed by crushing, to obtain coarse particles, and (4) a step of wet-pulverizing the coarse particles in an aqueous dispersant, to obtain an aqueous dispersion coating material containing fine particles having an average particle size of at most 10 μm.

In the above step (1) i.e. the step of mixing various starting materials which will be coating film-constituting components, to obtain a blend material, using a solid resin material as the main material, a coloring pigment, a curing agent, additives and, if necessary, a small amount of liquid material, are mixed as uniformly as possible.

As an apparatus for this purpose, a flash mixer, a screw mixer, a conical blender, a V-mixer, a tumbling mixer, a jet mixer, a kneader or a ribbon mixer, which is a common apparatus for mixing a powder material, may, for example, be employed.

It is preferred to mix and blend various starting materials as uniform as possible by means of such an apparatus. However, in a case where the total amount of such starting materials is small, the starting materials may simply be mixed in a bag and may be uniformly blended in the subsequent melt-kneading step. Particularly when a part or whole of an aqueous surfactant or an aqueous thickener which serves to facilitate dispersion of coating resin particles in an aqueous medium, is added in this mixing and blending step, formation of an aqueous dispersion coating material in the subsequent wet pulverization step will be facilitated, since the pulverized surfaces of the coating resin particles formed anew in the subsequent pulverization step will uniformly be hydrophilic.

Then, the above step (2) i.e. the step of melting and kneading the blend material at a temperature of at least the softening temperature of said resin component, to obtain a homogenized material, is carried out. This step is intended to homogeneously mix a solid resin material as a starting material of the coating resin particles, a coloring pigment, a curing agent, additives, etc. homogeneously to a level of at most a few $\mu$m. The resin material and the curing agent to be used in the process of the present invention are processed into pellets of a few mm for the purpose of facilitating handling during the transportation or blending and for preventing dusting. Such pellets are pulverized to obtain a mixture of particles of a few hundred $\mu$m, and such a mixture is heated to a temperature of at least the softening temperature of the resin component and mechanically kneaded.

The apparatus to be used for this kneading may, for example, be a roll mill, a screw kneader, a muller mixer or a kneader. Particularly preferred is a roll mill or a screw kneader from the viewpoint of the operation efficiency and handling efficiency. Such an apparatus is preferred from a view point such that after the melt-kneading, the kneaded product can be readily discharged from the apparatus and cooled. Especially, in the case of a cross-linkable aqueous dispersion coating material, a curing agent is incorporated in the coating resin particles, and the resin component, the curing agent, etc. are uniformly mixed in this melt-kneading step, whereby the mixture is heated to a temperature of at least softening temperature of the resin component, and if the residence time at the time of kneading is prolonged, a part of the resin component is likely to react with the curing agent, and consequently, the resulting coating film may not be smooth, or a defect such as inadequate gloss tends to result. Accordingly, it is preferred to employ an apparatus of the type to supply from one direction and continuously discharge from the other end.

Then, the above step (3) i.e. the step of cooling and solidifying the homogenized material, followed by crushing, to obtain coarse particles, will be carried out. The homogenized material of the coating resin prepared in the preceding melt kneading step will be a block-like when cooled and solidified, and the treatment in this step is a pretreatment to crush the block into coarse particles which can readily be treated by the subsequence wet-pulverization step. The apparatus for crushing may, for example, be a ring roll mill, an edge runner, a roll crusher, a disintegrator, a hammer crusher, an impeller breaker, a gylatory crusher or a jaw crusher.

Now, the above step (4) which is the most important in the present invention, i.e. the step of wet-pulverizing the coarse particles in an aqueous dispersant, to obtain an aqueous dispersion coating material containing fine particles having an average particle size of at most 10 $\mu$m, will be described.

Firstly, a necessary amount of water is put in a tank to receive the aqueous dispersion coating material. If necessary, a surfactant for wetting coating resin particles, or a precipitation-preventing agent, may, for example, be added to this water, followed by mixing and homogenizing. Such an aqueous medium is circulated by a circulation pump to the wet-system pulverizer. A supply inlet for the above coarse particles is provided on the inlet side of this circulation path of the wet system pulverizer. The coarse particles supplied thereto may be mixed with the aqueous medium by their own weight and then may be introduced into the wet system pulverizer, or they may be wetted by a certain mixer and then taken into the wet system pulverizer.

Here, it is important that an adequate amount of the aqueous medium is circulated in the wet system pulverizer so that cooling within the apparatus and transportation of pulverized fine particles can adequately be carried out. In the initial stage after initiation of the pulverization, the concentration of the coating resin particles in the circulating aqueous medium, is low, and the viscosity of the aqueous medium containing coating resin particles is accordingly low, whereby the aqueous medium containing coating resin particles can readily be circulated, but as the wet pulverization of coarse particles continuously added, proceeds, and circulation of the aqueous medium is repeated, the concentration of coating resin particles in the circulating aqueous medium, will increase, whereby circulation and cooling will gradually be difficult. If circulation of the aqueous medium stops, the coarse particles supplied into the circulating aqueous medium, and the coating resin particles circulated, are likely to melt by the pulverizing energy in the wet system pulverizer, and there will be a possible danger that they adhere to the inner surface of the apparatus. Accordingly, it is important to control the concentration of coating resin particles in the desired aqueous dispersion coating material, the fluidity, the amount of circulation of the aqueous dispersion coating material and the temperature. Usually, the circulation amount can easily be controlled, but the temperature rapidly increases as the circulation amount decreases. Accordingly, it is necessary to adequately control the amount of coarse particles supplied, the amount of the aqueous medium circulated and the concentration of coating resin particles in the final aqueous dispersion coating material.

Now, the wet system pulverizer which can be used in this wet-pulverization step will be described. Useful wet system pulverizers include, for example, a disc grinder, a tower mill, a ball mill, a vibration mill, an edge runner and a roll mill. In a wet system pulverizer employing a dispersion medium such as a tower mill, a ball mill or a vibration mill, if the size of the coarse particles supplied is larger than the particle size of the medium, the efficiency in the wet pulverization substantially deteriorates. Accordingly, in the case of a wet system pulverizer employing a dispersion medium, it is necessary to sufficiently reduce the particle size of the coarse particles as compared with the particle size of the medium, before supplying them. By a wet-system pulverizer of the type wherein the coarse particles are pulverized as pinched by rotary members, such as a disc grinder or a roll mill, even fairly large coarse particles can readily be pulverized, but if the circulation amount of the aqueous medium for wetting is inadequate or localized, the coating resin particles tend to fuse by heat generation.

With respect to the manner of operation of the wet system pulverizer, control is easy if the operation is carried out by maintaining the concentration of coating resin particles at a low level. Accordingly, it is preferred to adjust the concentration of coating resin particles by means of a centrifugal filtration machine, a centrifugal separator, a decanter or the like, as the case requires. With respect to the wet-pulverization treatment, the particles may be passed through the wet system pulverizer a plurality of times until the coating resin particles will have a predetermined particle size. Otherwise, coating resin particles having sizes beyond a predetermined size may be separated and removed by means of a filter or a centrifugal separator. After adjusting the concentration of the coating resin particles to a predetermined level, as a post adjustment, an additive such as, a fungicide, a defoaming or a tackifier, may, for example, be added to obtain an aqueous dispersion coating material.

The obtained aqueous dispersion coating material is one wherein the average particle size of the coating resin particles dispersed therein is at most 10 μm, and the concentration is from about 20 to 60 wt %.

An important feature of the process of the present invention is that the coating resin particles are readily wetted, dispersed and stabilized in an aqueous medium, since the particles are directly wet-pulverized in the aqueous medium to form a coating material, and, if necessary, a part or whole of an aqueous surfactant for dispersion in water or an aqueous thickener, is preliminarily added to the various starting materials which will be coating film-constituting components. As a result, as compared with a conventional slurry coating material prepared by a phase transition method or a conventional aqueous dispersion coating material obtained by wetting in an aqueous medium, fine particles obtained by finely pulverizing a powder coating material, the necessary amount of the aqueous wetting agent may be small, and an aqueous dispersion coating material containing coating resin particles having small particle sizes, can easily be prepared.

With respect to a method for coating the aqueous dispersion coating material obtained by the process of the present invention, a usual coating method employed for coating a usual liquid coating material, such as air splay coating, electrostatic coating, dip coating or brush coating, may be employed.

When the aqueous dispersion coating material obtained by the process of the present invention, is coated and in a state not yet dried, water in the interior of the coating film is freely movable among the coating resin particles by capillarity. Accordingly, in a drying process, when water is present in the interior of the coating film, as water evaporates on the coating film surface, water in the interior of the coating film freely moves among the coating resin particles to the coating film surface by capillarity. This moving speed is sufficiently fast even towards the end of the drying process and substantially high as compared with the speed at which water in the interior of the coating film in the case of a water-soluble resin coating material or an emulsion coating material, is supplied to the surface by diffusion. Accordingly, water evaporates from the coating film surface at a constant high speed. Accordingly, it is unlikely that water in the interior will boil by heating to form pin holes. Therefore, it is not required to incorporate a high boiling point solvent to adjust the boiling point, and VOC of the aqueous dispersion coating material is extremely small i.e. usually at most 1%.

In the process for preparing the aqueous dispersion coating material, there is no possibility that the coating resin particles etc. will be discharged as a dust or a fine powder out of the production installation, and any excess aqueous medium can be effectively used by recycling it for the next preparation of the aqueous dispersion coating material.

PROCESS FOR PREPARING THE POWDER COATING MATERIAL

The process for producing a powder coating material according to the present invention, comprises sequentially carrying out:

(1) a step of mixing various starting materials which will be coating film-constituting components, to obtain a blend material, (2) a step of melting and kneading the blend material at a temperature of at least the softening temperature of said resin component, to obtain a homogenized material, (3) a step of cooling and solidifying the homogenized material, followed by crushing, to obtain coarse particles, (4) a step of wet-pulverizing the coarse particles in an aqueous dispersant, to obtain an aqueous dispersion containing fine particles having an average particle size of at most 10 μm, and (5) a step of subjecting the aqueous dispersion to dehydration treatment, to obtain a powder coating material.

The above steps (1) to (4) are the same as steps (1) to (4) in the above described process for producing a aqueous dispersion coating material.

The above step (5) i.e. the step of subjecting the aqueous dispersion to dehydration treatment, to obtain a powder coating material, is carried out by removing water by means of a cake filtering machine such as a filter press, a leaf filter or a rotary filter, a centrifugal filtering machine or a centrifugal separator, followed by drying. By such dehydration and drying, the coating resin fine particles will agglomerate, and accordingly, they are subjected to pulverization treatment after drying to obtain a powder coating material. Now, the present invention will be described in further detail with reference to an Example. However, it should be understood that the present invention is by no means restricted to such a specific Example. In the Example, "parts" means "parts by weight".

EXAMPLE 32 parts of a polyester resin having a softening temperature of 120° C. and an acid value of 45, 32 parts of an epoxy resin of bisphenol A type having an epoxy equivalent of 910, 25 parts of titanium pigment, 6 parts of surface-regulating agent, 2.2 parts of an ultraviolet absorber, 1 part of an antioxidant, 1 part of a curing accelerator and 0.8 part of a non-ionic surfactant with HLB=16, were blended by a screw mixer and further homogeneously mixed by a flush mixer to obtain a blend material. On the other hand, 220 parts of water was taken into a stainless steel tank for a coating material, and 0.2 part of a non-ionic surfactant with HLB=16, was added and dissolved to obtain an aqueous medium. This aqueous medium was prepared to be circulated in a disc grinder by a pump.

As a melt-kneading machine, a twin screw kneader was employed, and the heating temperature was set at 115° C. At the forward end of the melt-kneading machine, a double roll cooling machine capable of rolling and cooling, was provided, and a hammer crusher was installed in front of it. The above mentioned uniformly mixed blend material was supplied from a feeder of the twin screw kneader, and melted and kneaded to obtain a homogenized material. The homogenized material was dropped from the forward end of the twin screw kneader as a viscous liquid of about 120° C. to a rolling roll of a double roll cooling machine and rolled and cooled to about room temperature. The obtained plate-like resin was subjected to primary pulverization by a hammer crusher to obtain a coarse powder of coating resin particles having a size with a diameter of about 0.5 mm. The coarse powder subjected to the primary pulverization was continuously mixed into the circulated aqueous medium in the circulation path on the inlet side of a disc grinder and introduced into the disc grinder. The disc grinder was operated with a grinder clearance of 250 µm at a rotational speed of 1,200 rpm, and wet-pulverization treatment was continuously carried out. After completion of the melt-kneading treatment of the blend material and supply of the coarse powder, the entirety was further passed through the disc grinder under the same condition for wet-pulverization. The obtained aqueous dispersion was passed through a vibration sieve of 400 mesh. On the stainless steel metal net of the sieve, substantially nothing remained. Then, water was slightly supplemented, and a fungicide, a defoaming agent and a tackifier were added to obtain an aqueous dispersion coating material having a non-volatile content of 45 wt % and a pH of 5.8. The particle size of the coating resin in this aqueous dispersion coating material was 6 µm as an average particle size, as a result of the measurement of the particle size distribution.

By an air spray coating method, this aqueous dispersion coating material was coated on an aluminum plate in various thicknesses between 5 µm to 80 µm, left to stand at room temperature for 3 minutes after the coating and then heated to 100° C. in 3 minutes in a dryer and then heated to 160° C. in 2 minutes, and maintained at 160° C. for 20 minutes, to obtain coating films of various thicknesses. With respect to the appearance of the coating films, no abnormality was observed with a coating film thickness of from 8 µm to 80 µm, and the coating films were uniform coating films having smoothness, although with a coated plate having a coating film thickness of 5 µm, some irregularities due to failure in continuity, were observed.

According to the process of the present invention, an aqueous dispersion coating material and a powder coating material having good stability with an average particle size of coating resin fine particles being at most 10 µm, can be produced in good yield with excellent energy efficiency by a relatively simple operation without necessity of using an organic solvent and without necessity of capturing a fine powder.

What is claimed is:

1. A process for preparing an aqueous dispersion coating material containing a resin component having a softening temperature of from 10 to 250° C., which comprises:
   (1) a step of mixing various starting materials which will be coating film-constituting components, to obtain a blend material,
   (2) a step of melting and kneading the blend material at a temperature of at least the softening temperature of said resin component, to obtain a homogenized material,
   (3) a step of cooling and solidifying the homogenized material, followed by crushing, to obtain coarse particles, and
   (4) a step of wet-pulverizing the coarse particles in an aqueous dispersant, to obtain an aqueous dispersion coating material containing fine particles having an average particle size of at most 10 µm.

2. The process according to claim 1, wherein the resin component is at least one member selected from the group consisting of an alkyd resin, an acrylic resin, a polyester resin, an epoxy resin, a melamine resin, a block isocyanate resin, a fluorine resin, a silicone resin, an amide resin and an ABS resin.

3. A process for preparing a powder coating material containing a resin component having a softening temperature of from 10 to 250° C., which comprises:
   (1) a step of mixing various starting materials which will be coating film-constituting components, to obtain a blend material,
   (2) a step of melting and kneading the blend material at a temperature of at least the softening temperature of said resin component, to obtain a homogenized material,
   (3) a step of cooling and solidifying the homogenized material, followed by crushing, to obtain coarse particles,
   (4) a step of wet-pulverizing the coarse particles in an aqueous dispersant, to obtain an aqueous dispersion containing fine particles having an average particle size of at most 10 µm, and
   (5) a step of subjecting the aqueous dispersion to dehydration treatment, to obtain a powder coating material.

4. The process according to claim 3, wherein the resin component is at least one member selected from the group consisting of an alkyd resin, an acrylic resin, a polyester resin, an epoxy resin, a melamine resin, a block isocyanate resin, a fluorine resin, a silicone resin, an amide resin and an ABS resin.

* * * * *